United States Patent
Khan et al.

(10) Patent No.: US 11,930,133 B2
(45) Date of Patent: Mar. 12, 2024

(54) SYSTEMS AND METHODS FOR REDIRECTING AN EMERGENCY CALLBACK TO A CONTACT OF AN EMERGENCY CALLER

(71) Applicant: Verizon Patent and Licensing Inc., Basking Ridge, NJ (US)

(72) Inventors: Kashif Khan, Keller, TX (US); Danysel Barthelme, Frisco, TX (US); Ronald E. Collier, II, Arlington, TX (US); Ertao Li, Plano, TX (US); Steve L. Padilla, Grapevine, TX (US); Gaurav Patel, Mckinney, TX (US); Shawn R. Pugh, Easton, PA (US); Shujaat Ali Siddique, Hillsborough, NJ (US); Daniel L. Walker, Wall Township, NJ (US); John Cao Vinh Nguyen, Trophy Club, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 211 days.

(21) Appl. No.: 17/643,912

(22) Filed: Dec. 13, 2021

(65) Prior Publication Data
US 2023/0188648 A1 Jun. 15, 2023

(51) Int. Cl.
*H04M 3/54* (2006.01)
*H04M 3/42* (2006.01)

(52) U.S. Cl.
CPC ......... *H04M 3/54* (2013.01); *H04M 3/42195* (2013.01)

(58) Field of Classification Search
CPC ...... H04M 3/42; H04M 3/42195; H04M 3/46; H04M 3/465; H04M 3/54
USPC ....... 379/37 TO, 46, 210.01, 211.02, 211.03, 379/211.04
See application file for complete search history.

(56) References Cited

U.S. PATENT DOCUMENTS

| | | | |
|---|---|---|---|
| 10,291,777 B1 * | 5/2019 | Luo ...................... H04M 3/5116 |
| 2010/0304705 A1 * | 12/2010 | Hursey .................. H04W 4/90 |
| | | | 455/445 |
| 2015/0181033 A1 * | 6/2015 | Keller ................. H04L 65/1036 |
| | | | 455/404.1 |
| 2019/0069142 A1 * | 2/2019 | Chiang ................. H04W 76/10 |
| 2022/0022019 A1 * | 1/2022 | Sangle ................ H04L 65/1066 |

* cited by examiner

*Primary Examiner* — Harry S Hong

(57) ABSTRACT

A device may determine that a failure occurred in an emergency call between a public-safety answering point (PSAP) and a first user device associated with an emergency caller, and may identify, based on determining the failure, one of a first option, a second option, or a third option for redirecting an emergency callback to a contact of the emergency caller. The device may cause, when the first option is identified, the emergency callback to be redirected to a second user device associated with the contact of the emergency caller, and may cause, when the first option is identified, a bearer path to be established between the PSAP and the second user device for the emergency callback.

20 Claims, 11 Drawing Sheets

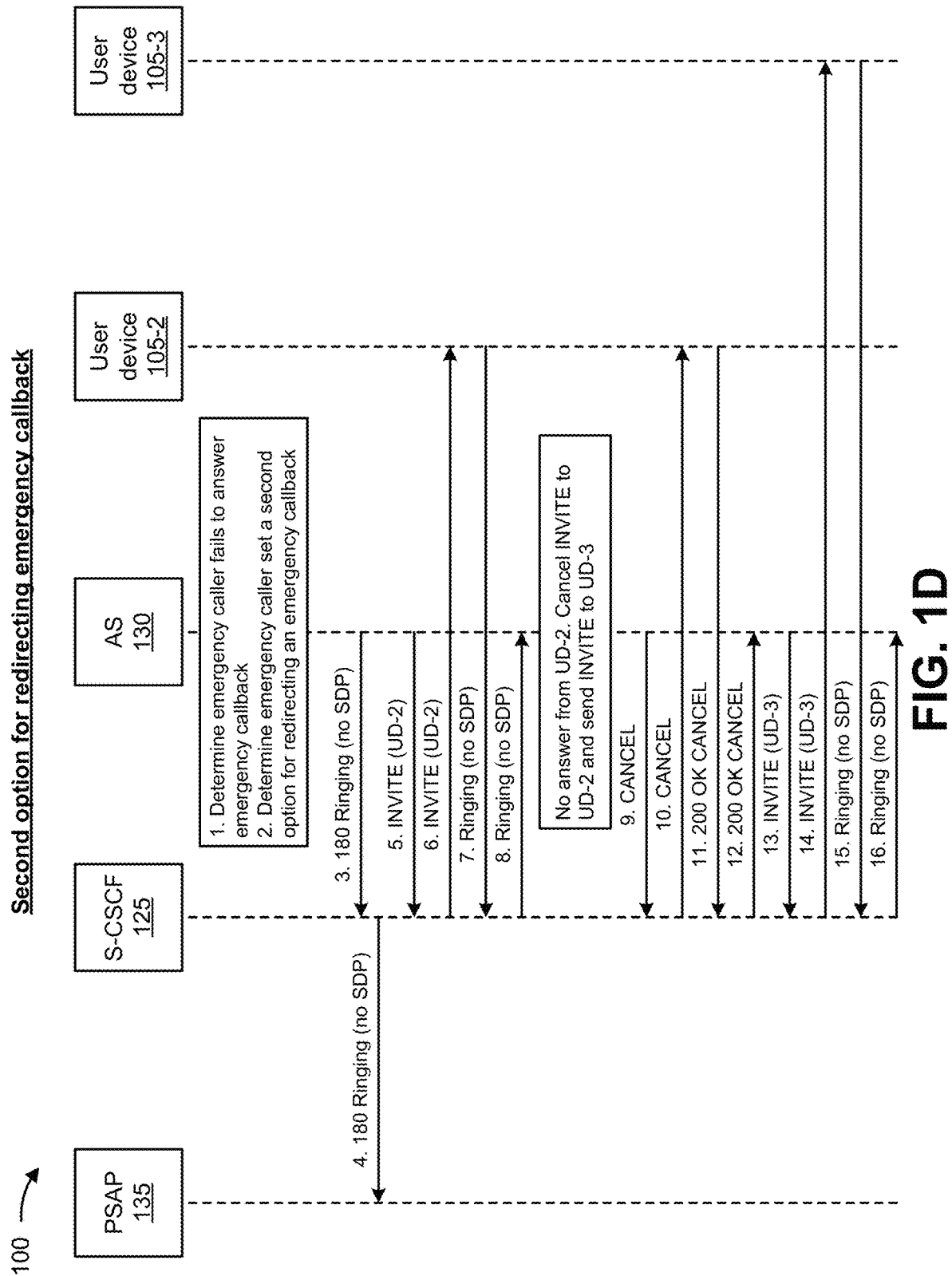

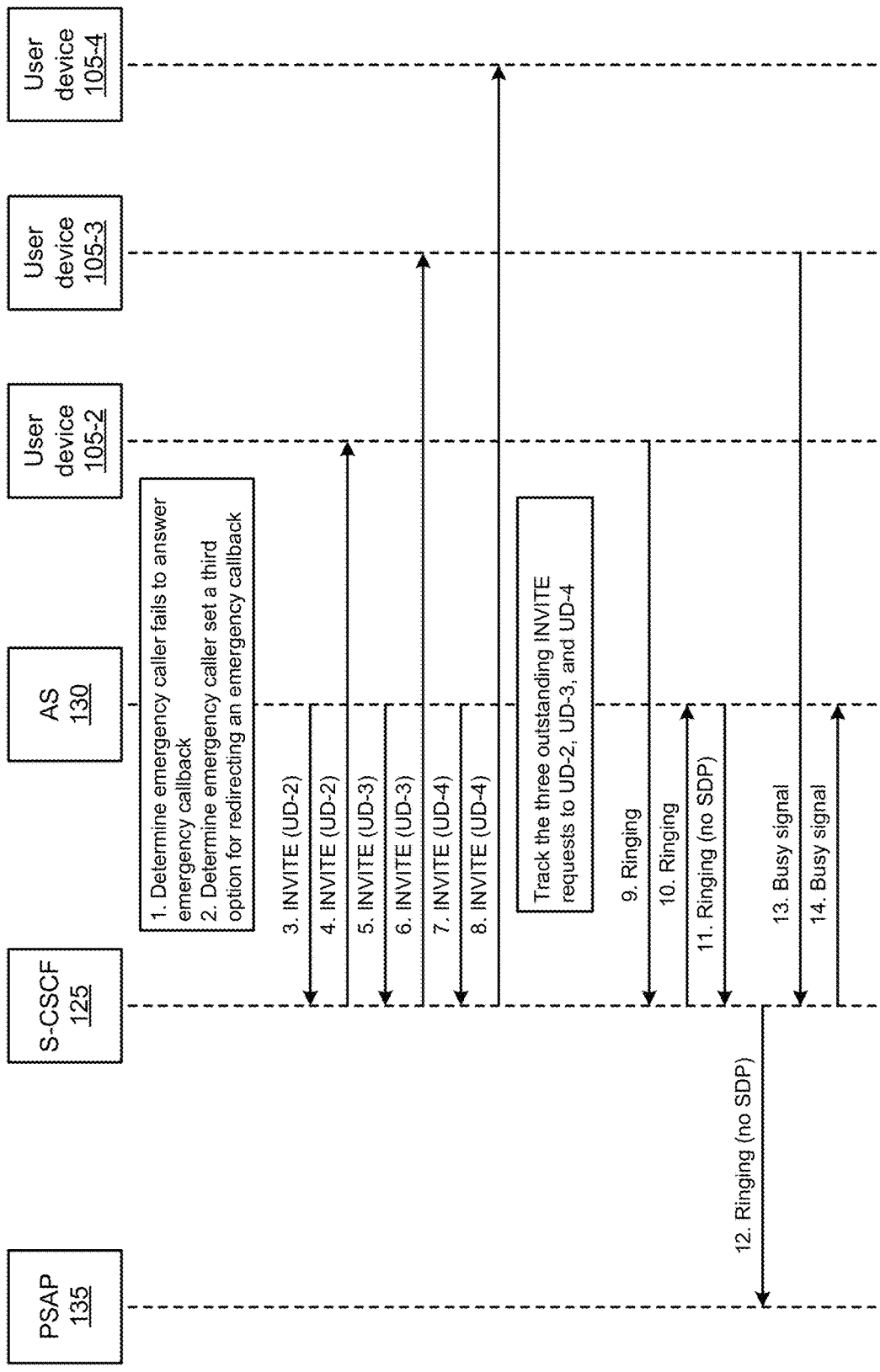

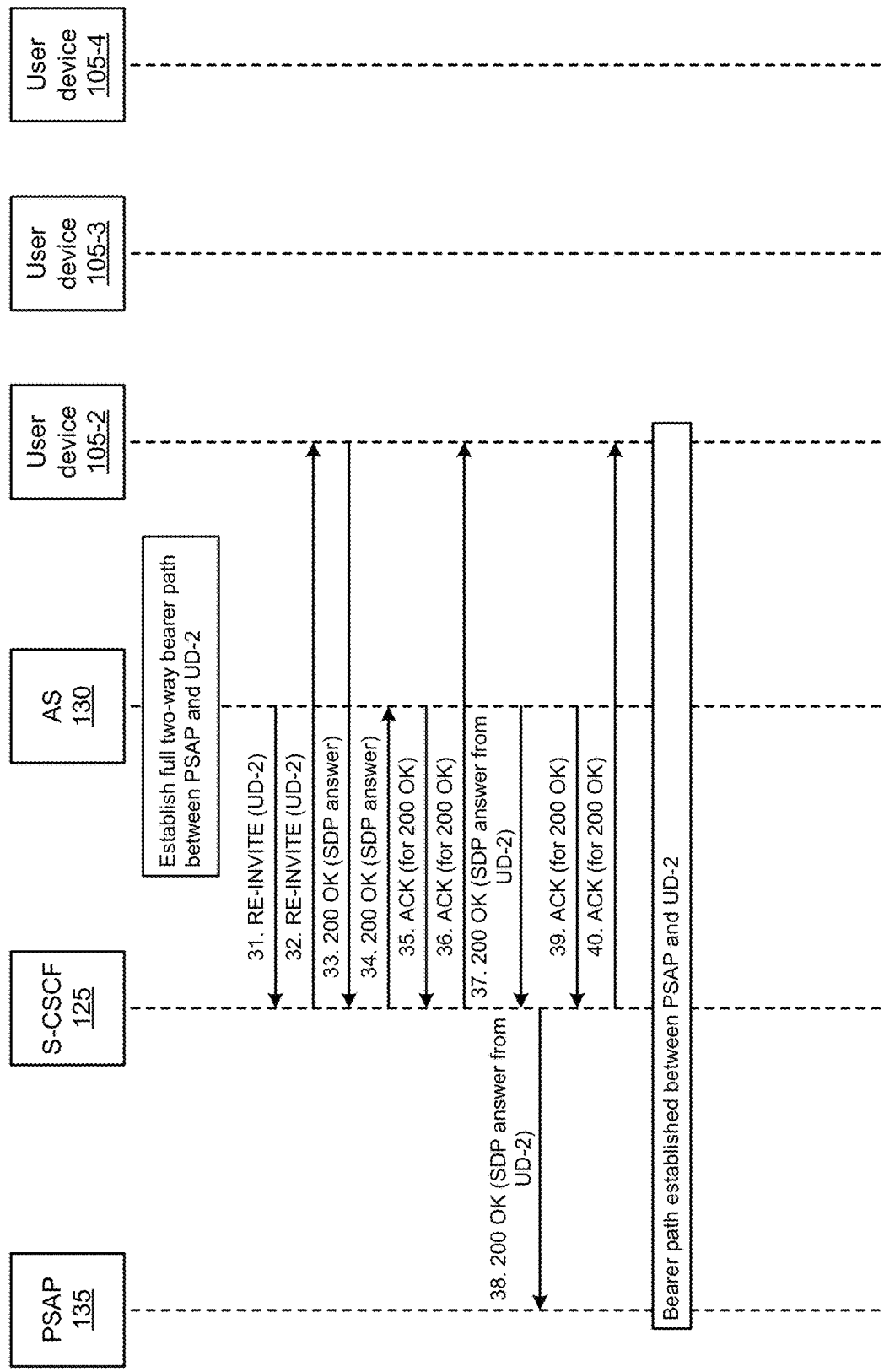

SYSTEMS AND METHODS FOR REDIRECTING AN EMERGENCY CALLBACK TO A CONTACT OF AN EMERGENCY CALLER

BACKGROUND

Currently, when an emergency call on a wireless network (e.g., a fourth generation (4G) or fifth generation (5G) network) is inadvertently disconnected and a public-safety answering point (PSAP) operator attempts to call back to the emergency caller, the callback may be blocked, forwarded to an incorrect number, or not answered by the emergency caller (e.g., due to incapacitation of the emergency caller).

BRIEF DESCRIPTION OF THE DRAWINGS

FIGS. 1A-1H are diagrams of an example associated with redirecting an emergency callback to a contact of an emergency caller.

DETAILED DESCRIPTION OF EXAMPLE EMBODIMENTS

Figure 1A:
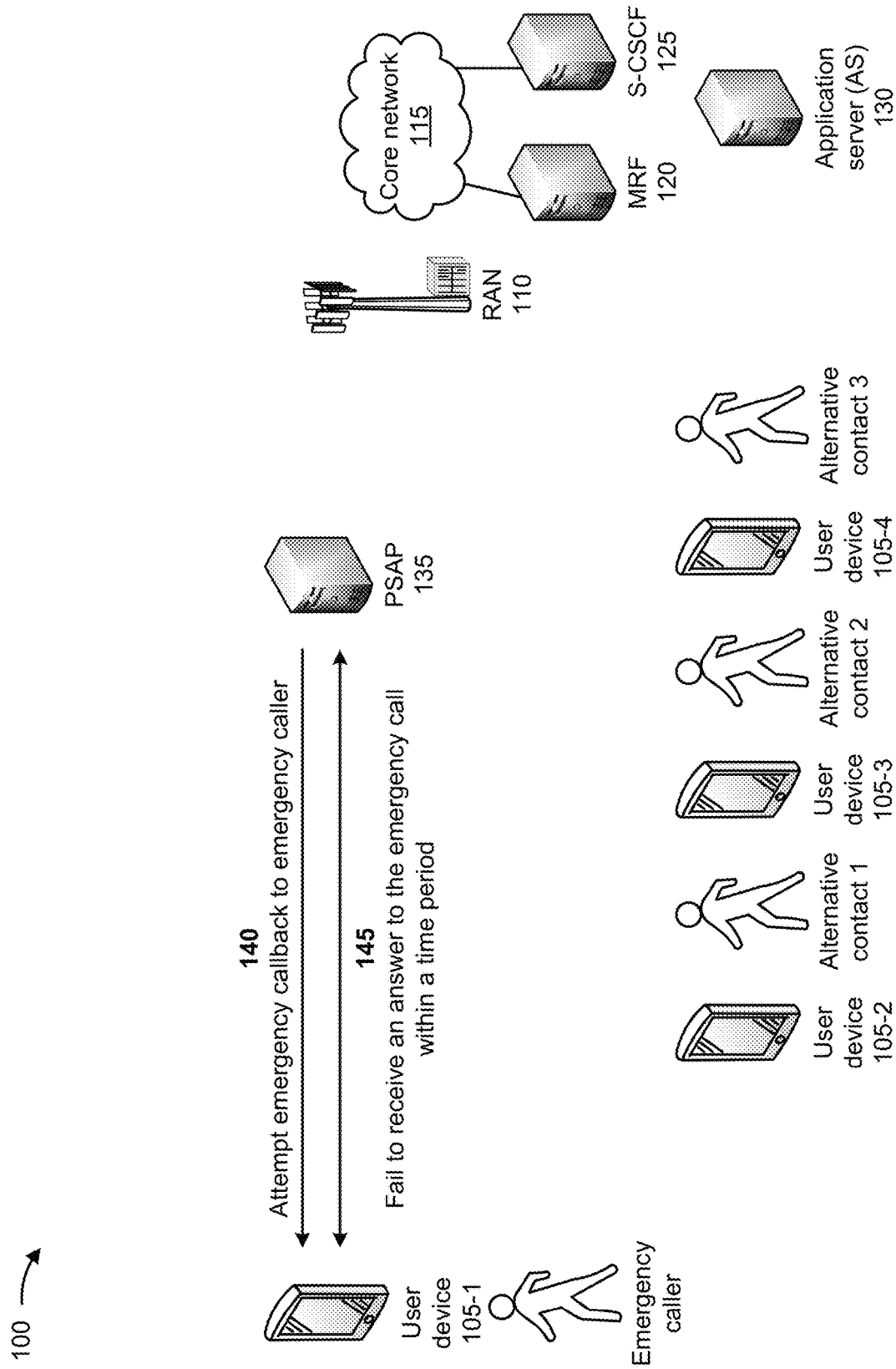

The following detailed description of example implementations refers to the accompanying drawings. The same reference numbers in different drawings may identify the same or similar elements.

Currently, there are two mechanisms to determine whether a call termination is a PSAP callback. A first mechanism defines a header field value (e.g., called a PSAP-callback) for a session initiation protocol (SIP) priority header field. The SIP priority header field is only supported by an Internet protocol (IP)-based PSAP. However, most existing PSAPs are not IP-based, which prevents utilization of the first mechanism. The second mechanism includes a PSAP callback timer-based solution. In the solution, when an emergency call is terminated and a call termination is received within a certain time interval after the emergency call is terminated, then the call termination may be interpreted as a PSAP callback. The second mechanism may be utilized regardless of whether the PSAP is IP-based.

However, a PSAP callback may be blocked by user-configured authorization policies or may be forwarded since SIP entities cannot differentiate the PSAP callback from any other SIP call. For example, incoming call barring, do not disturb, or call diversion (e.g., call forwarding to voicemail) are features that prevent delivery of a call. Such features prevent a PSAP operator from reaching the emergency caller when an emergency call is disconnected. The PSAP callback timer-based solution bypasses such features when a call termination is determined to be an emergency callback. However, there are scenarios in which the emergency caller cannot answer the PSAP callback (e.g., the emergency caller may become unconscious or incapacitated, due to various reasons, and cannot answer the PSAP callback). In such scenarios, the PSAP operator is unable to reach the emergency caller when the emergency caller may be in imminent danger. Thus, current mechanisms to determine whether a call termination is a PSAP callback consume computing resources (e.g., processing resources, memory resources, communication resources, and/or the like), networking resources, transportation resources, and/or other resources associated with failing to provide an emergency callback to an emergency caller, attempting to contact to the emergency caller, attempting to locate the emergency caller, dispatching emergency personnel to an emergency caller with an unknown location, and/or the like.

Some implementations described herein provide an application server that redirects an emergency callback to a contact of an emergency caller. For example, the application server may determine that a failure occurred in an emergency call between a PSAP and a first user device associated with an emergency caller, and may identify, based on determining the failure, one of a first option, a second option, or a third option for redirecting an emergency callback to a contact of the emergency caller. When the first option is identified, the application server may cause the emergency callback to be redirected to a second user device associated with the contact of the emergency caller, and may cause a bearer path to be established between the PSAP and the second user device for the emergency callback. When the second option is identified, the application server may cause the emergency callback to be sequentially redirected to a set of user devices associated with a set of contacts of the emergency caller, and may cause another bearer path to be established between the PSAP and a particular user device, of the set of user devices, that first answers the emergency callback. When the third option is identified, the application server may cause the emergency callback to be simultaneously redirected to a set of user devices associated with a set of contacts of the emergency caller, and may cause another bearer path to be established between the PSAP and a particular user device, of the set of user devices, that first answers the emergency callback.

In this way, the application server redirects an emergency callback to a contact of an emergency caller. For example, the application server may provide new mechanisms for a PSAP operator to reach an alternative contact of an emergency caller when an initial emergency call is disconnected, and the emergency caller is not able to answer an emergency callback from the PSAP operator. Thus, the application server may conserve computing resources, networking resources, transportation resources, and/or other resources that would otherwise have been consumed by failing to provide an emergency callback to an emergency caller, attempting to contact to the emergency caller, attempting to locate the emergency caller, dispatching emergency personnel to an emergency caller with an unknown location, and/or the like.

FIGS. 1A-1H are diagrams of an example 100 associated with redirecting an emergency callback to a contact of an emergency caller. As shown in FIGS. 1A-1H, example 100 includes a first user device 105-1 (e.g., associated with an emergency caller), a second user device 105-2 associated with a first alternative contact (e.g., alternative contact 1), a third user device 105-3 associated with a second alternative contact (e.g., alternative contact 2), a fourth user device 105-4 associated with a third alternative contact (e.g., alternative contact 2), a radio access network (RAN) 110, a core network 115, a media resource function (MRF) 120, a serving-call session control function (S-CSCF) 125, an application server (AS) 130, and a PSAP 135. Further details of the user devices 105, the RAN 110, a core network 115, the MRF 120, the S-CSCF 125, the application server 130, and the PSAP 135 are provided elsewhere herein.

As shown in FIG. 1A, and by reference number 140, the PSAP 135 may attempt an emergency callback to the emergency caller associated with the first user device 105-1. For example, the emergency caller may utilize the first user device 105-1 to place an emergency call, via a wireless network (e.g., the RAN 110), with the PSAP 135. However, the emergency call may be inadvertently disconnected and an operator of the PSAP 135 may attempt to call back the emergency caller and the first user device 105-1, via the emergency callback.

As further shown in FIG. 1A, and by reference number 145, the PSAP 135 may fail to receive an answer to the emergency callback within a time period (e.g., in seconds, minutes, and/or the like). For example, the PSAP 135 may fail to receive an answer to the emergency callback within the time period when the emergency callback is blocked by user-configured authorization policies (e.g., incoming call barring, do not disturb, and/or the like), forwarded to an incorrect number (e.g., call forwarding to a voicemail), or not answered by the emergency caller (e.g., due to incapacitation of the emergency caller). Thus, the emergency callback fails to reach the emergency caller after disconnection of the emergency call, and the operator of the PSAP 135 is unable to help the emergency caller. In some implementations, the application server 130 may bypass authorization policies, for the first user device 105-1, when it is determined that the failure occurred in the emergency call between the PSAP 135 and the first user device 105-1.

When the PSAP 135 fails to receive the answer to the emergency callback within the time period, the application server 130 may be notified and/or determine that a failure occurred in the emergency call between the PSAP 135 and the first user device 105-1 associated with the emergency caller. For example, the PSAP 135 may notify the application server 130 that the failure occurred in the emergency call between the PSAP 135 and the first user device 105-1 associated with the emergency caller. In some implementations, the application server 130 identifies, based on determining or receiving a notification of the failure, one of a first option, a second option, or a third option for redirecting an emergency callback to a contact of the emergency caller.

Figure 1B:
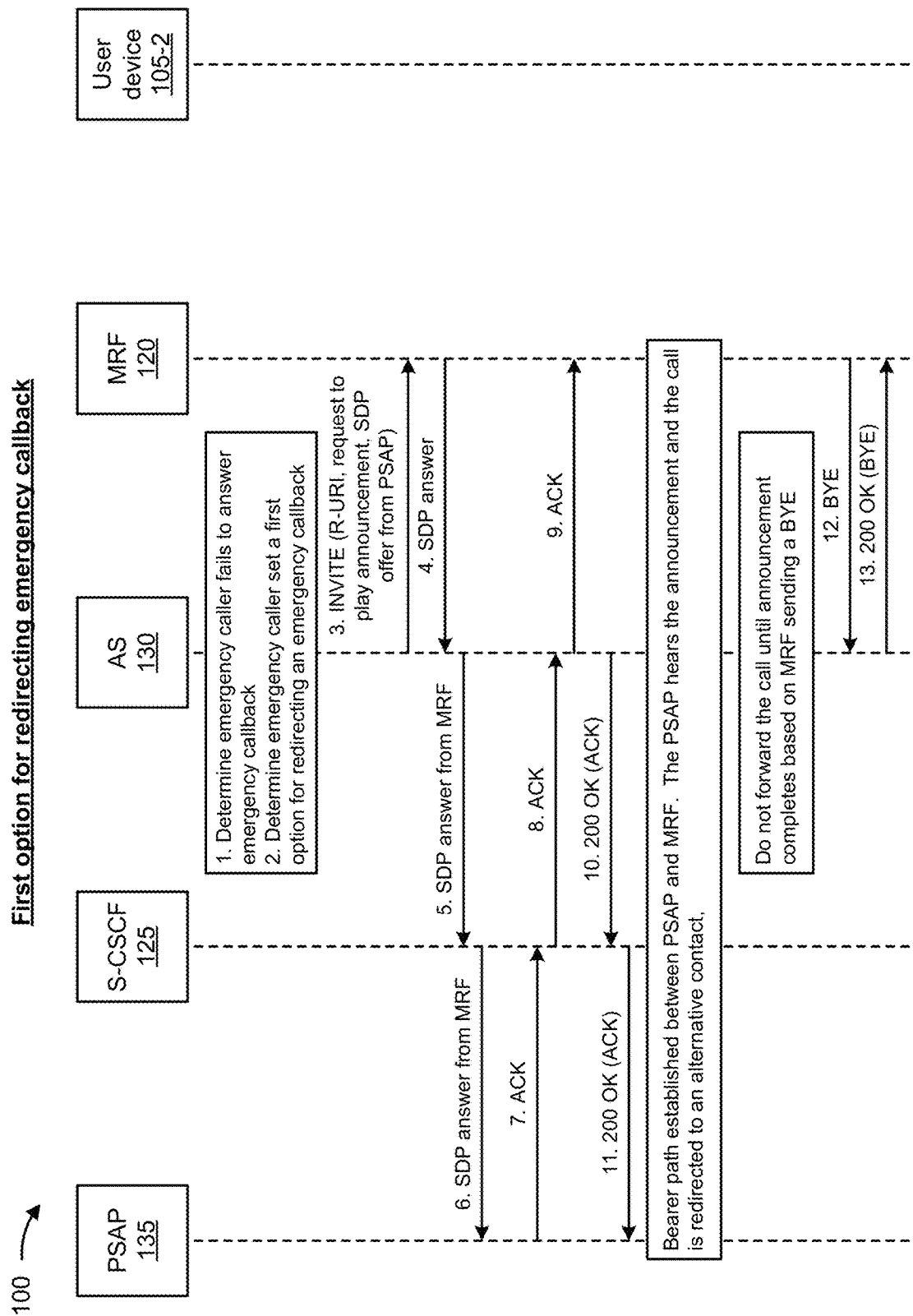
Figure 1C:
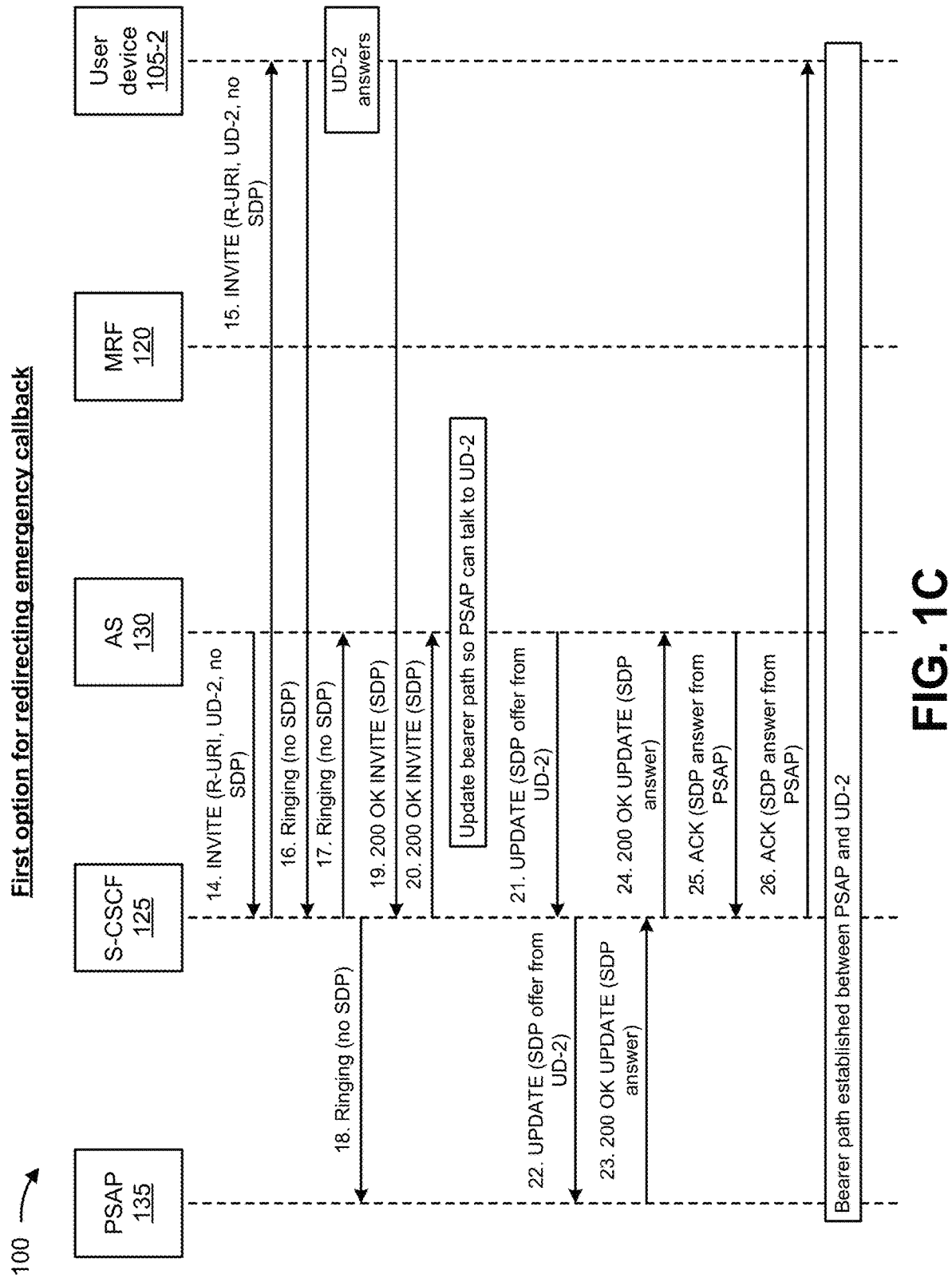

FIGS. 1B and 1C depict a call flow of the steps involved when the first option (e.g., a single number immediate redirect option), for redirecting an emergency callback to a contact of the emergency caller, is identified by the application server 130. As shown at step 1 of FIG. 1B, the application server 130 may determine that the emergency caller fails to answer the emergency callback from the PSAP 135. For example, the PSAP 135 may notify the application server 130 that the emergency caller fails to answer the emergency callback from the PSAP 135. As shown at step 2 of FIG. 1B, the application server 130 may determine that the emergency caller set the first option for redirecting an emergency callback to a contact of the emergency caller. For example, prior to the emergency (e.g., when configuring the first user device 105-1), the emergency caller may utilize the first user device 105-1 to select the first option for redirecting an emergency callback to a contact of the emergency caller.

The application server 130 may generate an invite message (e.g., session initiation protocol (SIP) invite message) that includes a request for a uniform resource identifier (R-URI), a request to play an announcement, a session description protocol (SDP) offer from the PSAP 135, and/or the like. In some implementations, the announcement may include an announcement that will be played to the operator of the PSAP 135 before the emergency callback is redirected to and established the contact of the emergency caller. The announcement may inform the operator of the PSAP 135 that the emergency caller failed to answer the emergency callback and that the emergency callback is being redirected to an alternative contact of the emergency caller. As shown at step 3 of FIG. 1B, application server 130 may provide the invite message to the MRF 120. In some implementations, the announcement may also be utilized with the second option (e.g., a sequential flow option) and the third option (e.g., a simultaneous flow option), described below.

As shown at step 4 of FIG. 1B, the MRF 120 may provide, to the application server 130, an SDP answer to the invite message. The SDP answer may indicate that the MRF 120 approves the invite message and may include the content of the invite message. As shown at steps 5 and 6 of FIG. 1B, the application server 130 may forward the SDP answer to the S-CSCF 125, and the S-CSCF 125 may forward the SDP answer to the PSAP 135. The PSAP 135 may generate an acknowledgement of receipt of the SDP answer. As shown at steps 7-9 of FIG. 1B, the PSAP 135 may provide the acknowledgement to the S-CSCF 125, the S-CSCF 125 may forward the acknowledgement to the application server 130, and the application server 130 may forward the acknowledgement to the MRF 120. The application server 130 may generate a response (e.g., another acknowledgement) to the acknowledgement. As shown at steps 10 and 11 of FIG. 1B, the application server 130 may provide the response to the acknowledgement to the S-CSCF 125, and the S-CSCF 125 may forward the response to the acknowledgement to the PSAP 135.

As further shown in FIG. 1B, a bearer path may be established between the PSAP 135 and the MRF 120. The operator of the PSAP 135 may listen to the announcement (e.g., of the invite message) and the emergency callback may be redirected to an alternative contact of the emergency caller, via the bearer path. In some implementations, the application server 130 may not forward the emergency callback to the alternative contact until the announcement completes playing for the operator of the PSAP 135. As shown at step 12 of FIG. 1B, the MRF 120 may provide, to the application server 130, a BYE message indicating that the announcement completed playing for the operator of the PSAP 135. As shown at step 13 of FIG. 1B, the application server 130 may provide, to the MRF 120, an acknowledgement that the BYE message was received by the application server 130.

When the application server 130 receives the BYE message, the application may generate an invite message that includes the R-URI; an identifier of the second user device 105-2 (e.g., UD-2, an international mobile subscriber identity (IMSI), an international mobile station equipment identity (IMEI), and/or the like) associated with the contact; an alert tone to be played by the second user device 105-2 (e.g., to obtain the attention of the alternative contact); a caller display name of "PSAP operator" so that the alternative contact knows that the call is from the operator of the PSAP 135; and/or the like. Since the SDP offer originally received from the PSAP 135 was answered by the SDP answer provided by the MRF 120, the same SDP offer may not be provided to the second user device 105-2. Instead, the application server 130 may omit the SDP offer from the invite message. As shown at steps 14 and 15 of FIG. 1C, the application server 130 may provide the invite message to the S-CSCF 125, and the S-CSCF 125 may forward the invite message to the second user device 105-2.

The second user device 105-2 may receive the invite message and may generate a ringing message until the contact answers the emergency callback via the second user device 105-2. As shown at steps 16-18 of FIG. 1C, the second user device 105-2 may provide the ringing message to the S-CSCF 125, and the S-CSCF 125 may forward the ringing message to the application server 130 and the PSAP 135. When the contact answers the emergency callback, the second user device 105-2 may generate an acknowledgement of the invite message. As shown at steps 19 and 20 of FIG. 1C, the second user device 105-2 may provide the acknowledgement of the invite message to the S-CSCF 125, and the S-CSCF 125 may forward the acknowledgement of the invite message to the application server 130. When the acknowledgement of the invite message is received, the application server 130 may update the bearer path so that the PSAP 135 may connect with the second user device 105-2. For example, the application server 130 may generate an update message that includes an SDP offer from the second user device 105-2.

As shown at steps 21 and 22 of FIG. 1C, the application server 130 may provide the update message to the S-CSCF 125, and the S-CSCF 125 may forward the update message to the PSAP 135. The PSAP 135 may generate an update acknowledgement message that includes an SDP answer based on the update message. As shown at steps 23 and 24 of FIG. 1C, the PSAP 135 may provide the update acknowledgement message to the S-CSCF 125, and the S-CSCF 125 may forward the update acknowledgement message to the application server 130. The application server 130 may generate an acknowledgment of the update acknowledgement message. As shown at steps 25 and 26 of FIG. 1C, the application server 130 may provide the acknowledgment of the update acknowledgement message to the S-CSCF 125, and the S-CSCF 125 may forward the acknowledgment of the update acknowledgement message to the second user device 105-2. Once the second user device 105-2 receives the acknowledgment of the update acknowledgement message, the bearer path between the PSAP 135 and the second user device 105-2 may be established.

Figure 1E:
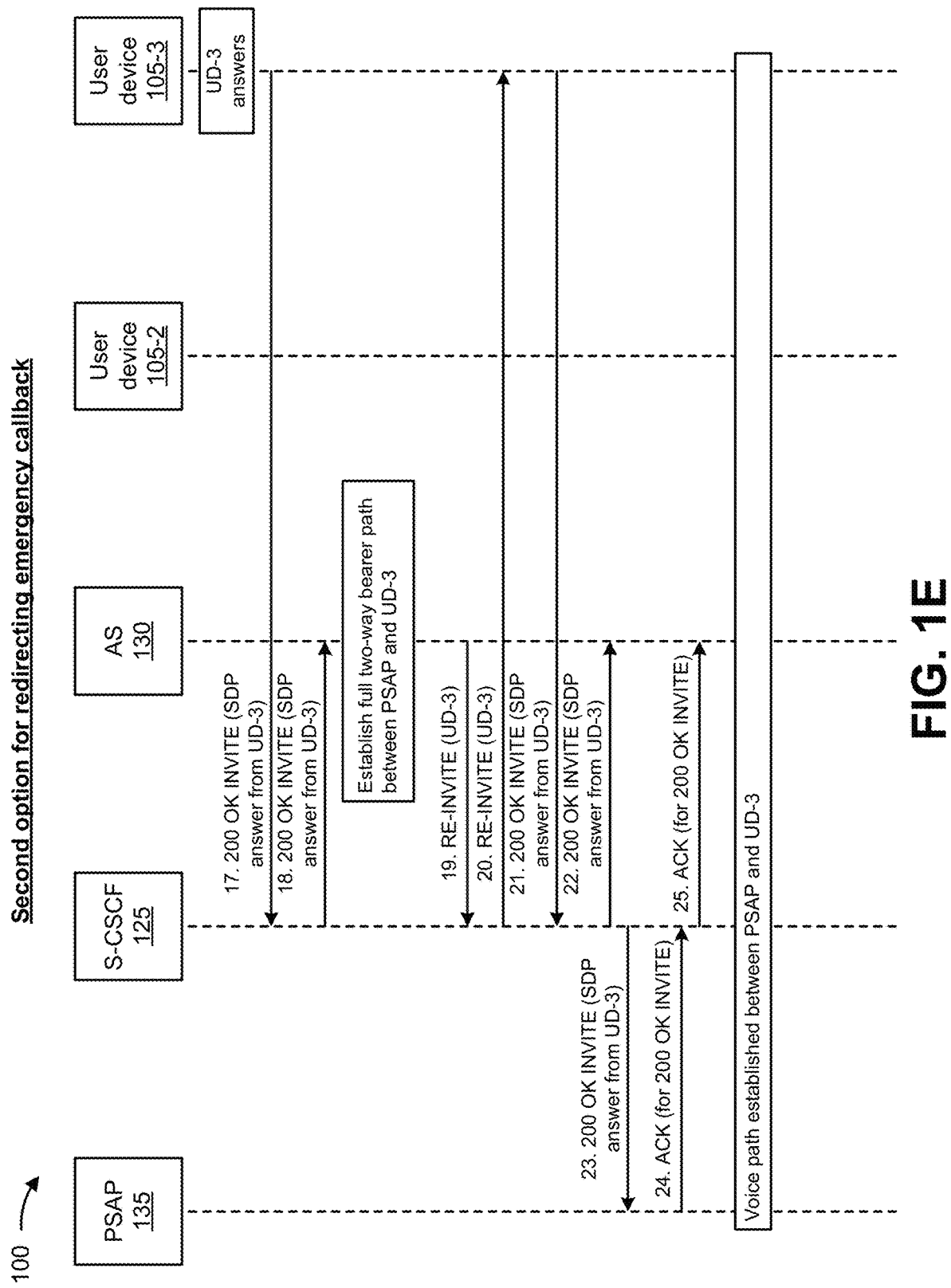

FIGS. 1D and 1E depict a call flow of the steps involved when the second option (e.g., a sequential flow option), for redirecting an emergency callback to a contact of the emergency caller, is identified by the application server 130. As shown at step 1 of FIG. 1D, the application server 130 may determine that the emergency caller fails to answer the emergency callback from the PSAP 135. For example, the PSAP 135 may notify the application server 130 that the emergency caller fails to answer the emergency callback from the PSAP 135. As shown at step 2 of FIG. 1D, the application server 130 may determine that the emergency caller set the second option for redirecting an emergency callback to a contact of the emergency caller. For example, prior to the emergency (e.g., when configuring the first user device 105-1), the emergency caller may utilize the first user device 105-1 to select the second option for redirecting an emergency callback to a contact of the emergency caller. In some implementations, when the second option is identified, application server 130 may determine that the emergency callback is to be sequentially redirected to a set of user devices 105 (e.g., the second user device 105-2 and the third user device 105-3) associated with a set of contacts (e.g., the first alternative contact and the second alternative contact) of the emergency caller.

The application server 130 may generate a ringing message for the emergency callback. As shown at steps 3 and 4 of FIG. 1D, the application server 130 may provide the ringing message to the S-CSCF 125, and the S-CSCF 125 may forward the ringing message to the PSAP 135. The application server 130 may generate an invite message that includes an R-UM, an identifier of the second user device 105-2 (e.g., UD-2, an IMSI, an IMEI, and/or the like), an alert tone to be played by the second user device 105-2 (e.g., to obtain the attention of the first alternative contact); a caller display name of "PSAP operator" so that the first alternative contact knows that the call is from the operator of the PSAP 135, and/or the like. As shown at steps 5 and 6 of FIG. 1D, the application server 130 may provide the invite message to the S-CSCF 125, and the S-CSCF 125 may forward the invite message to the second user device 105-2. The second user device 105-2 may receive the invite message and may generate a ringing message until the first alternative contact answers the emergency callback via the second user device 105-2. As shown at steps 7 and 8 of FIG. 1D, the second user device 105-2 may provide the ringing message to the S-CSCF 125, and the S-CSCF 125 may forward the ringing message to the application server 130.

The first alternative contact may not answer the emergency callback with the second user device 105-2 (e.g., due to not possessing the second user device 105-2, not paying attention to the second user device 105-2, and/or the like). When the second user device 105-2 fails to answer the emergency callback, the application server 130 may generate a cancel message to cancel the invite message sent to the second user device 105-2, and may generate another invite message that includes an R-URI, an identifier of the third user device 105-3 (e.g., UD-3, an IMSI, an IMEI, and/or the like), an alert tone to be played by the third user device 105-3 (e.g., to obtain the attention of the second alternative contact); a caller display name of "PSAP operator" so that the second alternative contact knows that the call is from the operator of the PSAP 135, and/or the like.

As shown at steps 9 and 10 of FIG. 1D, the application server 130 may provide the cancel message to the S-CSCF 125, and the S-CSCF 125 may forward the cancel message to the second user device 105-2. As shown at steps 11 and 12 of FIG. 1D, the second user device 105-2 may provide an acknowledgement of the cancel message to the S-CSCF 125, and the S-CSCF 125 may forward the acknowledgement of the cancel message to the application server 130. The emergency callback with the second user device 105-2 may be canceled at this point. As shown at steps 13 and 14 of FIG. 1D, the application server 130 may provide the other invite message to the S-CSCF 125, and the S-CSCF 125 may forward the invite message to the third user device 105-3. The third user device 105-3 may receive the other invite message and may generate a ringing message until the second alternative contact answers the emergency callback via the third user device 105-3. As shown at steps 15 and 16 of FIG. 1D, the third user device 105-3 may provide the ringing message to the S-CSCF 125, and the S-CSCF 125 may forward the ringing message to the application server 130.

When the second alternative contact answers the emergency callback, the third user device 105-3 may generate an acknowledgement of the other invite message. As shown at steps 17 and 18 of FIG. 1E, the third user device 105-3 may provide the acknowledgement of the other invite message to the S-CSCF 125, and the S-CSCF 125 may forward the acknowledgement of the other invite message to the application server 130. When the acknowledgement of the other invite message is received, the application server 130 may establish a full two-way bearer path between the PSAP 135 and the third user device 105-3. For example, the application server 130 may generate a Re-INVITE message that includes an SDP offer from the third user device 105-3.

As shown at steps 19 and 20 of FIG. 1D, the application server 130 may provide the Re-INVITE message to the S-CSCF 125, and the S-CSCF 125 may forward the Re-INVITE message to the third user device 105-3. The third user device 105-3 may generate a Re-INVITE acknowledgement message that includes an SDP answer based on the Re-INVITE message. As shown at steps 21-23 of FIG. 1D, the third user device 105-3 may provide the Re-INVITE acknowledgement message to the S-CSCF 125, and the S-CSCF 125 may forward the Re-INVITE acknowledgement message to the application server 130 and the PSAP 135. The PSAP 135 may generate an acknowledgment of the Re-INVITE acknowledgement message. As shown at steps 24 and 25 of FIG. 1D, the PSAP 135 may provide the acknowledgment of the Re-INVITE acknowledgement message to the S-CSCF 125, and the S-CSCF 125 may forward the acknowledgment of the Re-INVITE acknowledgement message to the application server 130. Once the application server 130 receives the acknowledgment of the Re-INVITE acknowledgement message, a voice path between the PSAP 135 and the third user device 105-3 may be established.

Figure 1G:
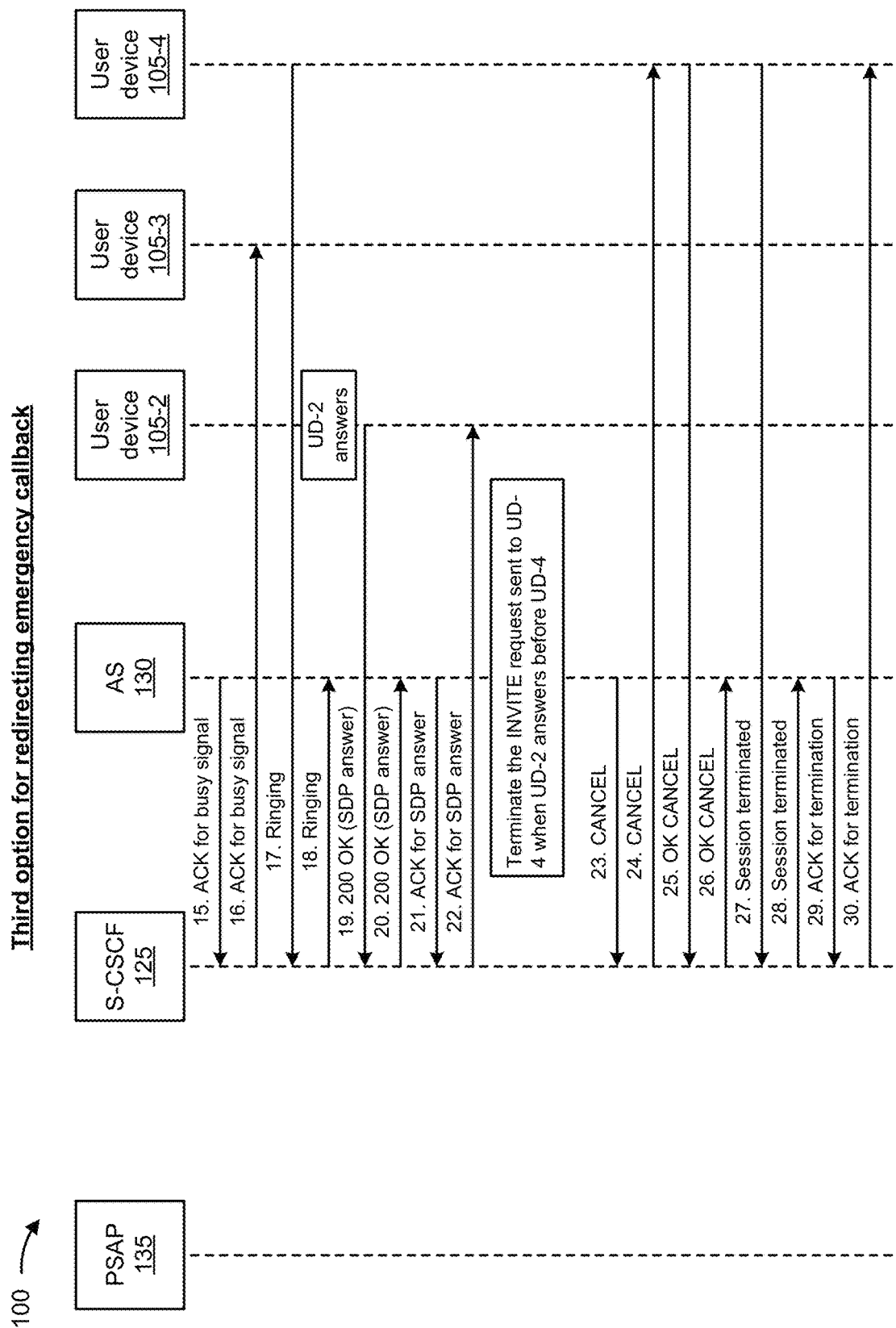

FIGS. 1F-1H depict a call flow of the steps involved when the third option (e.g., a simultaneous flow option), for redirecting an emergency callback to a contact of the emergency caller, is identified by the application server 130. As shown at step 1 of FIG. 1F, the application server 130 may determine that the emergency caller fails to answer the emergency callback from the PSAP 135. For example, the PSAP 135 may notify the application server 130 that the emergency caller fails to answer the emergency callback from the PSAP 135. As shown at step 2 of FIG. 1F, the application server 130 may determine that the emergency caller set the third option for redirecting an emergency callback to a contact of the emergency caller. For example, prior to the emergency (e.g., when configuring the first user device 105-1), the emergency caller may utilize the first user device 105-1 to select the third option for redirecting an emergency callback to a contact of the emergency caller. In some implementations, when the third option is identified, application server 130 may determine that the emergency callback is to be simultaneously redirected to a set of user devices 105 (e.g., the second user device 105-2, the third user device 105-3, and the fourth user device 105-4) associated with a set of contacts (e.g., the first alternative contact, the second alternative contact, and the third alternative contact) of the emergency caller.

The application server 130 may simultaneously generate a first invite message, a second invite message, and a third invite message. The first invite message includes an R-URI, an identifier of the second user device 105-2 (e.g., UD-2, an IMSI, an IMEI, and/or the like), an alert tone to be played by the second user device 105-2 (e.g., to obtain the attention of the first alternative contact); a caller display name of "PSAP operator" so that the first alternative contact knows that the call is from the operator of the PSAP 135, and/or the like. The second invite message includes an R-URI, an identifier of the third user device 105-3 (e.g., UD-3, an IMSI, an IMEI, and/or the like), an alert tone to be played by the third user device 105-3 (e.g., to obtain the attention of the second alternative contact); a caller display name of "PSAP operator" so that the second alternative contact knows that the call is from the operator of the PSAP 135, and/or the like. The third invite message includes an R-URI, an identifier of the fourth user device 105-4 (e.g., UD-4, an IMSI, an IMEI, and/or the like), an alert tone to be played by the fourth user device 105-4 (e.g., to obtain the attention of the third alternative contact); a caller display name of "PSAP operator" so that the third alternative contact knows that the call is from the operator of the PSAP 135, and/or the like.

As shown at steps 3-8 of FIG. 1F, the application server 130 may simultaneously provide the first invite message, the second invite message, and the third invite message to the S-CSCF 125. The S-CSCF 125 may forward the first invite message to the second user device 105-2, may forward the second invite message to the third user device 105-3, and may forward the third invite message to the fourth user device 105-4. The application server 130 may track the statuses of the first invite message, the second invite message, and the third invite message provided to the second user device 105-2, the third user device 105-3, and the fourth user device 105-4, respectively.

The second user device 105-2 may receive the first invite message and may generate a ringing message until the first alternative contact answers the emergency callback via the second user device 105-2. As shown at steps 9 and 10 of FIG. 1F, the second user device 105-2 may provide the ringing message to the S-CSCF 125, and the S-CSCF 125 may forward the ringing message to the application server 130. As shown at steps 11 and 12 of FIG. 1F, the application server 130 may return the ringing message to the S-CSCF 125, and the S-CSCF 125 may forward the ringing message to the PSAP 135.

The third user device 105-3 may receive the second invite message and may generate a busy signal in response to the second invite message. As shown at steps 13 and 14 of FIG. 1F, the third user device 105-3 may provide the busy signal to the S-CSCF 125, and the S-CSCF 125 may forward the busy signal to the application server 130. As shown at steps 15 and 16 of FIG. 1G, the application server 130 may provide an acknowledgement of the busy signal to the S-CSCF 125, and the S-CSCF 125 may forward the acknowledgement of the busy signal to the third user device 105-3. In some implementations, since the third user device 105-3 did not answer the second invite message, the application server 130 need not cancel the second invite message (e.g., since the busy signal may cancel the second invite message).

The fourth user device 105-4 may receive the third invite message and may generate a ringing message until the third alternative contact answers the emergency callback via the fourth user device 105-4. As shown at steps 17 and 18 of FIG. 1G, the fourth user device 105-4 may provide the ringing message to the S-CSCF 125, and the S-CSCF 125 may forward the ringing message to the application server 130. However, before the third alternative contact answers the emergency callback via the fourth user device 105-4, the first alternative contact may answer the emergency callback via the second user device 105-2.

When the first alternative contact answers the emergency callback, the second user device 105-2 may generate an acknowledgement of the first invite message. As shown at steps 19 and 20 of FIG. 1G, the second user device 105-2 may provide the acknowledgement of the first invite message to the S-CSCF 125, and the S-CSCF 125 may forward the acknowledgement of the first invite message to the application server 130. When the acknowledgement of the first invite message is received, the application server 130 may generate a response (e.g., an acknowledgement) to the acknowledgement of the first invite message. As shown at steps 21 and 22 of FIG. 1G, the application server 130 may provide the response to the acknowledgement of the first invite message to the S-CSCF 125, and the S-CSCF 125 may forward the response to the acknowledgement of the first invite message to the second user device 105-2.

When the fourth user device 105-4 fails to answer the emergency callback before the second user device 105-2 answers the emergency callback, the application server 130 may generate a cancel message to cancel the third invite message sent to the fourth user device 105-4. As shown at steps 23 and 24 of FIG. 1G, the application server 130 may provide the cancel message to the S-CSCF 125, and the S-CSCF 125 may forward the cancel message to the fourth user device 105-4. As shown at steps 25 and 26 of FIG. 1G, the fourth user device 105-4 may provide an acknowledgement of the cancel message to the S-CSCF 125, and the S-CSCF 125 may forward the acknowledgement of the cancel message to the application server 130. As shown at steps 27 and 28 of FIG. 1G, the fourth user device 105-4 may provide a session terminated message to the S-CSCF 125, and the S-CSCF 125 may forward the session terminated message to the application server 130. As shown at steps 29 and 30 of FIG. 1G, the application server 130 may provide an acknowledgement of the session terminated message to the S-CSCF 125, and the S-CSCF 125 may forward the acknowledgement of the session terminated message to the fourth user device 105-4. The emergency callback with the fourth user device 105-4 may be canceled or terminated at this point.

When the acknowledgement of the first invite message is received, the application server 130 may establish a full two-way bearer path between the PSAP 135 and the second user device 105-2. For example, the application server 130 may generate a Re-INVITE message that includes an SDP offer from the second user device 105-2. As shown at steps 31 and 32 of FIG. 1H, the application server 130 may provide the Re-INVITE message to the S-CSCF 125, and the S-CSCF 125 may forward the Re-INVITE message to the second user device 105-2. The second user device 105-2 may generate a Re-INVITE acknowledgement message that includes an SDP answer based on the Re-INVITE message. As shown at steps 33 and 34 of FIG. 1H, the second user device 105-2 may provide the Re-INVITE acknowledgement message to the S-CSCF 125, and the S-CSCF 125 may forward the Re-INVITE acknowledgement message to the application server 130. As shown at steps 35 and 36 of FIG. 1H, the application server 130 may provide an acknowledgement of the Re-INVITE acknowledgement message to the S-CSCF 125, and the S-CSCF 125 may provide the acknowledgement of the Re-INVITE acknowledgement message to the second user device 105-2.

As shown at steps 37 and 38 of FIG. 1H, the application server 130 may provide the Re-INVITE acknowledgement message to the S-CSCF 125, and the S-CSCF 125 may forward the Re-INVITE acknowledgement message to the PSAP 135. The application server 130 may generate an acknowledgment of the Re-INVITE acknowledgement message. As shown at steps 39 and 40 of FIG. 1H, the application server 130 may provide the acknowledgment of the Re-INVITE acknowledgement message to the S-CSCF 125, and the S-CSCF 125 may forward the acknowledgment of the Re-INVITE acknowledgement message to the second user device 105-2. Once the second user device 105-2 receives the acknowledgment of the Re-INVITE acknowledgement message, a bearer path between the PSAP 135 and the second user device 105-2 may be established.

In some implementations, the emergency caller may utilize first user device 105-1 to create an emergency file that includes information to use when the emergency caller fails to answer the emergency callback from the PSAP 135. For example, the emergency file may include an image of the emergency caller's vehicles and license plates, an image of the emergency caller's face, an image of the emergency caller's dog, a home address of the emergency caller (e.g., an apartment number that identifies a floor and an apartment of the emergency caller), a work address of the emergency caller (e.g., a building, an office number, and a floor of the building where the emergency caller works). This information may be utilized by the application server 130 and/or the PSAP 135, when the PSAP 135 can only determine a partial location of the emergency caller based on the initial emergency call. For example, if a young child is trapped in a minivan and passes out after making an emergency call, the operator may cause the PSAP 135 to send an image of the minivan and license plate information to a responding officer so that the officer can determine if the minivan is located in an area near the officer. The PSAP 135 may provide an image of the child to a closed-captioned television (CCTV) database that includes recent images of people and/or objects in the vicinity of where the emergency call originated. The CCTV database may be searched to determine if an image matching the image of the child can be found and used to narrow a field of search for determining the location of the minivan.

In this way, the application server 130 redirects an emergency callback to a contact of an emergency caller, where the contact can be a person or a data store, such as an emergency file. For example, the application server 130 may provide new mechanisms for a PSAP operator to reach an alternative contact of an emergency caller when an initial emergency call is disconnected, and the emergency caller is not able to answer an emergency callback from the PSAP operator. Thus, the application server 130 may conserve computing resources, networking resources, transportation resources, and/or other resources that would otherwise have been consumed by failing to provide an emergency callback to an emergency caller, attempting to contact to the emergency caller, attempting to locate the emergency caller, dispatching emergency personnel to an emergency caller with an unknown location, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
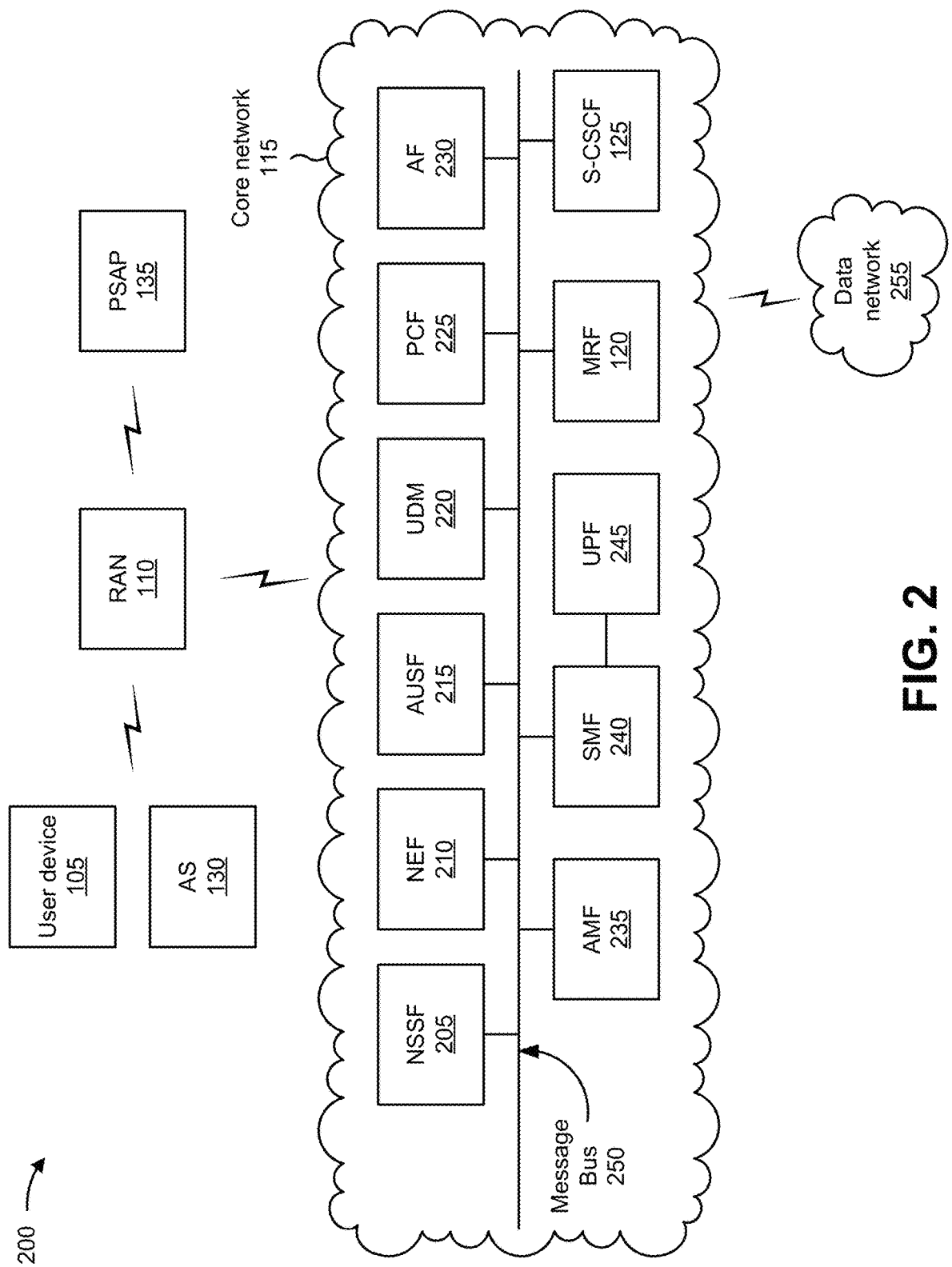
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the user device 105, the RAN 110, the core network 115, the application server 130, the PSAP 135, and a data network 255. Devices and/or networks of the example environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

In some implementations, the core network 115 may include an example functional architecture in which systems and/or methods described herein may be implemented. For example, the core network 115 may include an example architecture of a fifth generation (5G) next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

The application server 130 includes one or more devices capable of receiving, generating, storing, processing, providing, and/or routing information, as described elsewhere herein. The application server 130 may include a communication device and/or a computing device. For example, the application server 130 may include a server, such as an application server, a client server, a web server, a database server, a host server, a proxy server, a virtual server (e.g., executing on computing hardware), or a server in a cloud computing system. In some implementations, the application server 130 includes computing hardware used in a cloud computing environment.

The PSAP 135 includes one or more devices capable of receiving, generating, storing, processing, providing, and/or routing information, as described elsewhere herein. The PSAP 135 may include a communication device and/or a computing device. For example, the PSAP 135 may include a call center where emergency calls (e.g., for law enforcement services, fire services, ambulance services, and/or the like) initiated by any mobile or landline subscriber are terminated. The PSAP 135 may be responsible for answering calls to an emergency telephone number for law enforcement services, fire services, ambulance services, and/or the like.

As shown in FIG. 2, the core network 115 may include a number of functional elements. The functional elements may include, for example, the MRF 120, the S-CSCF 125, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, and/or a user plane function (UPF) 245 These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The MRF 120 includes one or more devices that perform a variety of processing tasks on media streams associated with particular services, such as, for example, coordination and distribution of voice traffic associated with a conference, playing of announcements to the subscriber (e.g., session failure or redirection announcements), transcoding of voice or video streams to facilitate successful session establishment, and/or the like.

The S-CSCF 125 includes one or more devices that are responsible for session control. Subscribers may be allocated the S-CSCF 125 for a duration of an IP multimedia subsystem (IMS) registration in order to facilitate routing of SIP messages as part of service establishment procedures. The S-CSCF 125 may retrieve a subscriber profile at the time of registration, which allows the S-CSCF 125 to ascertain to which application server service requests should be sent.

The NSSF 205 includes one or more devices that select network slice instances for the user device 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the user device 105 in the wireless telecommunications system.

The UDM 220 includes one or more devices that store user data and profiles in the wireless telecommunications system. The UDM 220 may be used for fixed access and/or mobile access in the core network 115.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 240 includes one or more devices that support the establishment, modification, and release of communication sessions in the wireless telecommunications system. For example, the SMF 240 may configure traffic steering policies at the UPF 245 and/or may enforce user equipment IP address allocation and policies, among other examples.

The UPF 245 includes one or more devices that serve as an anchor point for intraRAT and/or interRAT mobility. The UPF 245 may apply rules to packets, such as rules pertaining to packet routing, traffic reporting, and/or handling user plane QoS, among other examples.

The message bus 250 represents a communication structure for communication among the functional elements. In other words, the message bus 250 may permit communication between two or more functional elements.

The data network 255 includes one or more wired and/or wireless data networks. For example, the data network 255 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
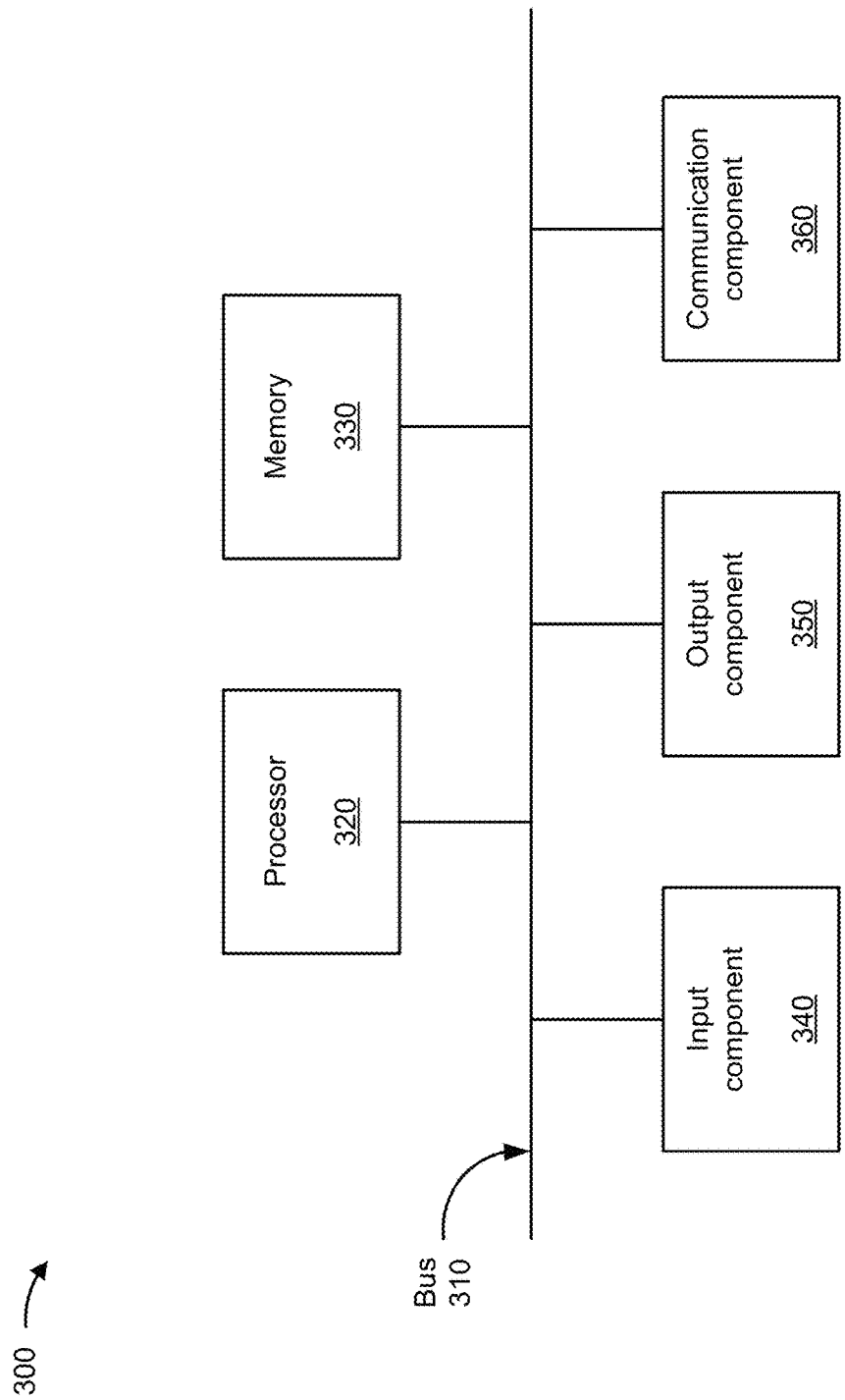
FIG. 3 is a diagram of example components of one or more devices of FIG. 2.

FIG. 3 is a diagram of example components of a device 300, which may correspond to the user device 105, the RAN 110, the MRF 120, the S-CSCF 125, the application server 130, the PSAP 135, the NSSF 205, the NEF 210, the AUSF 215, the UDM 220, the PCF 225, the AF 230, the AMF 235, the SMF 240, and/or the UPF 245. In some implementations, the user device 105, the RAN 110, the MRF 120, the S-CSCF 125, the application server 130, the PSAP 135, the NSSF 205, the NEF 210, the AUSF 215, the UDM 220, the PCF 225, the AF 230, the AMF 235, the SMF 240, and/or the UPF 245 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
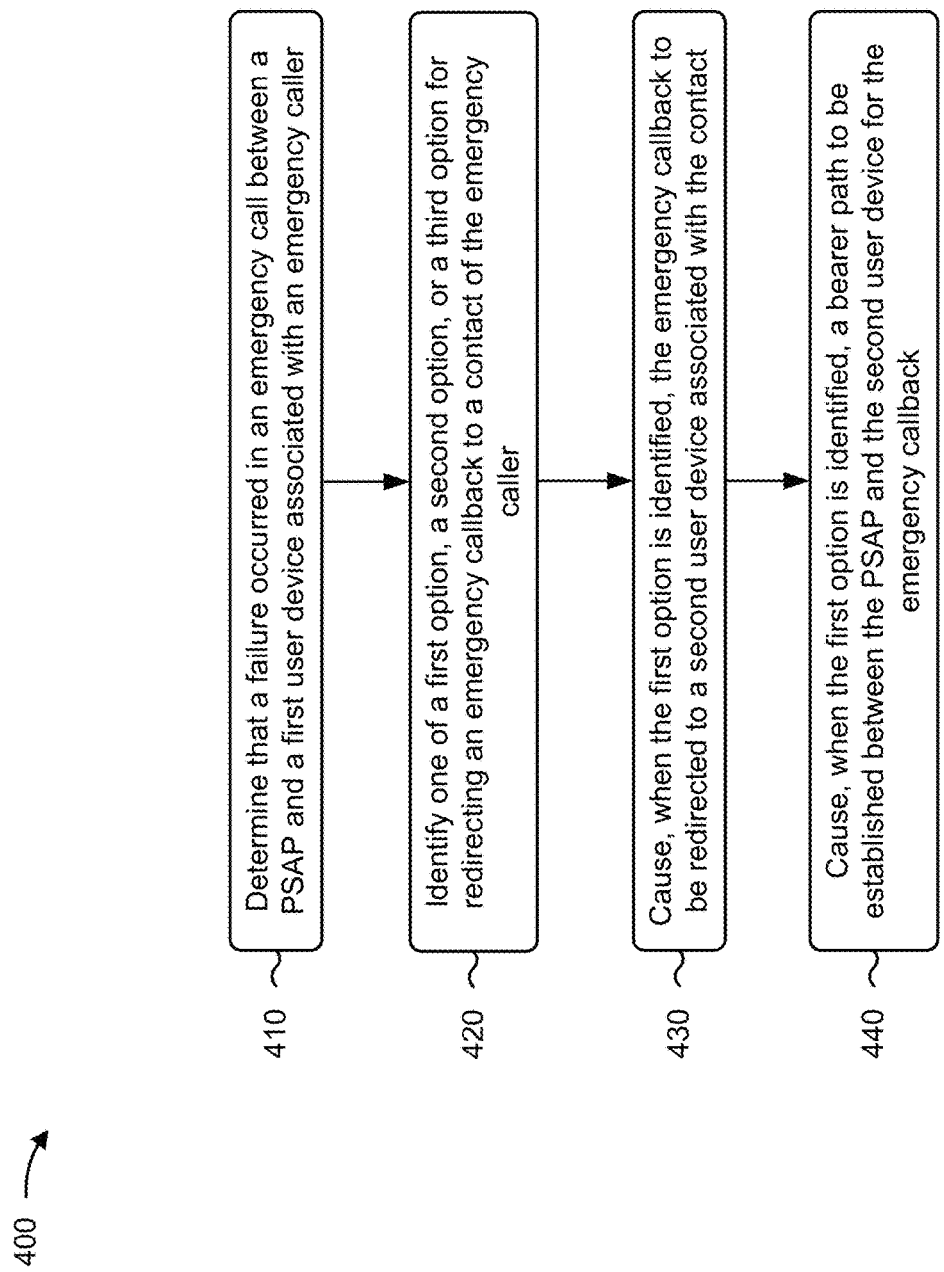
FIG. 4 is a flowchart of an example process for redirecting an emergency callback to a contact of an emergency caller.

FIG. 4 is a flowchart of an example process 400 for redirecting an emergency callback to a contact of an emergency caller. In some implementations, one or more process blocks of FIG. 4 may be performed by a device (e.g., the application server 130). In some implementations, one or more process blocks of FIG. 4 may be performed by another device or a group of devices separate from or including the device, such as a MRF (e.g., the MRF 120) and/or an S-CSCF (e.g., the S-CSCF 125). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include determining that a failure occurred in an emergency call between a PSAP and a first user device associated with an emergency caller (block 410). For example, the device may determine that a failure occurred in an emergency call between a PSAP and a first user device associated with an emergency caller, as described above. In some implementations, the emergency callback is generated by the PSAP after an emergency call between the PSAP and the first user device is disconnected. In some implementations, determining that the failure occurred in the emergency call between the PSAP and the first user device includes determining that the PSAP failed to answer the emergency call when the PSAP fails to answer the emergency call within a predetermined time period.

As further shown in FIG. 4, process 400 may include identifying, based on determining the failure, one of a first option, a second option, or a third option for redirecting an emergency callback to a contact of the emergency caller (block 420). For example, the device may identify, based on determining the failure, one of a first option, a second option, or a third option for redirecting an emergency callback to a contact of the emergency caller, as described above.

As further shown in FIG. 4, process 400 may include causing, when the first option is identified, the emergency callback to be redirected to a second user device associated with the contact of the emergency caller (block 430). For example, the device may cause, when the first option is identified, the emergency callback to be redirected to a second user device associated with the contact of the emergency caller, as described above.

As further shown in FIG. 4, process 400 may include causing, when the first option is identified, a bearer path to be established between the PSAP and the second user device for the emergency callback (block 440). For example, the device may cause, when the first option is identified, a bearer path to be established between the PSAP and the second user device for the emergency callback, as described above. In some implementations, causing the bearer path to be established between the PSAP and the second user device for the emergency callback includes causing the bearer path to be established between a network device and the second user device, receiving an indication that the contact answered the emergency callback via the second user device; and updating, based on the indication, the bearer path to enable the PSAP to communicate with the second user device.

In some implementations, causing the bearer path to be established between the PSAP and the second user device for the emergency callback includes providing, to a first network device, an invite that includes an SDP offer from the PSAP; receiving, from the first network device, an SDP answer to the invite; forwarding the SDP answer to the PSAP; receiving an acknowledgment of the SDP answer from the PSAP; and causing the bearer path to be established based on the acknowledgment of the SDP answer.

In some implementations, process 400 includes bypassing authorization policies, for the first user device, when it is determined that the failure occurred in the emergency call between the PSAP and the first user device.

In some implementations, process 400 includes causing a special alert tone to be provided on the second user device, causing an identification of an operator of the PSAP to be provided to the second user device, and causing an announcement, indicating that the emergency callback is being redirected to the contact, to be provided to the PSAP. In some implementations, the announcement is provided to the PSAP prior to causing the emergency callback to be redirected to the second user device.

In some implementations, process 400 includes causing, when the second option is identified, the emergency callback to be sequentially redirected to a set of user devices associated with a set of contacts of the emergency caller; and causing, when the second option is identified, another bearer path to be established between the PSAP and a particular user device, of the set of user devices, that first answers the emergency callback. In some implementations, process 400 includes causing a special alert tone to be provided on the particular user device; causing an identification of an operator of the PSAP to be provided to the particular user device; and causing an announcement, indicating that the emergency callback is being redirected to the particular user device, to be provided to the PSAP. In some implementations, process 400 includes canceling redirection of the emergency callback to one or more of the set of user devices that fail to answer the emergency callback.

In some implementations, process 400 includes causing, when the third option is identified, the emergency callback to be simultaneously redirected to a set of user devices associated with a set of contacts of the emergency caller; and causing, when the third option is identified, another bearer path to be established between the PSAP and a particular user device, of the set of user devices, that first answers the emergency callback. In some implementations, process 400 includes causing a special alert tone to be provided on the particular user device; causing an identification of an operator of the PSAP to be provided to the particular user device; and causing an announcement, indicating that the emergency callback is being redirected to the particular user device, to be provided to the PSAP. In some implementations, process 400 includes canceling redirection of the emergency callback to one or more of the set of user devices that fail to answer the emergency callback prior to the particular user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   determining, by a device, that a failure occurred in an emergency call between a public-safety answering point (PSAP) and a first user device associated with an emergency caller;
   identifying, by the device and based on determining the failure, one of a first option, a second option, or a third option for redirecting an emergency callback to a contact of the emergency caller;
   providing, by the device, to the PSAP, and when the first option is identified, an announcement associated with redirecting the emergency callback;
   causing, by the device, based on receiving an indication associated with completion of the announcement, and when the first option is identified, the emergency callback to be redirected to a second user device associated with the contact of the emergency caller; and
   causing, by the device and when the first option is identified, a bearer path to be established between the PSAP and the second user device for the emergency callback.

2. The method of claim 1, wherein the emergency callback is generated by the PSAP after the emergency call between the PSAP and the first user device is disconnected.

3. The method of claim 1, wherein determining that the failure occurred in the emergency call between the PSAP and the first user device comprises:
   determining that the PSAP failed to answer the emergency call when the PSAP fails to answer the emergency call within a predetermined time period.

4. The method of claim 1, further comprising:
   bypassing authorization policies, for the first user device, when it is determined that the failure occurred in the emergency call between the PSAP and the first user device.

5. The method of claim 1, further comprising:
   causing a special alert tone to be provided on the second user device; and
   causing an identification of an operator of the PSAP to be provided to the second user device.

6. The method of claim 1, wherein causing the bearer path to be established between the PSAP and the second user device for the emergency callback comprises:
   causing the bearer path to be established between a network device and the second user device;
   receiving an indication that the contact answered the emergency callback via the second user device; and
   updating, based on the indication that the contact answered the emergency callback via the second user device, the bearer path to enable the PSAP to communicate with the second user device.

7. A device, comprising:
   one or more processors configured to:
      determine that a failure occurred in an emergency call between a public-safety answering point (PSAP) and a first user device associated with an emergency caller,
         wherein an emergency callback is generated by the PSAP after the emergency call between the PSAP and the first user device is disconnected;
      identify, based on determining the failure, one of a first option, a second option, or a third option for redirecting the emergency callback to a contact of the emergency caller;
      provide, to the PSAP and when the first option is identified, an announcement associated with redirecting the emergency callback;
      cause, based on receiving an indication associated with the announcement and when the first option is identified, the emergency callback to be redirected to a second user device associated with the contact of the emergency caller; and cause, when the first option is identified, a bearer path to be established between the PSAP and the second user device for the emergency callback.

8. The device of claim 7, wherein the one or more processors are further configured to:
cause, when the second option is identified, the emergency callback to be sequentially redirected to a set of user devices associated with a set of contacts of the emergency caller; and
cause, when the second option is identified, another bearer path to be established between the PSAP and a particular user device, of the set of user devices, that first answers the emergency callback.

9. The device of claim 8, wherein the one or more processors are further configured to:
cause a special alert tone to be provided on the particular user device;
cause an identification of an operator of the PSAP to be provided to the particular user device; and
cause the announcement, indicating that the emergency callback is being redirected to the particular user device, to be provided to the PSAP.

10. The device of claim 8, wherein the one or more processors are further configured to:
cancel redirection of the emergency callback to one or more of the set of user devices that fail to answer the emergency callback.

11. The device of claim 7, wherein the one or more processors are further configured to:
cause, when the third option is identified, the emergency callback to be simultaneously redirected to a set of user devices associated with a set of contacts of the emergency caller; and
cause, when the third option is identified, another bearer path to be established between the PSAP and a particular user device, of the set of user devices, that first answers the emergency callback.

12. The device of claim 11, wherein the one or more processors are further configured to:
cause a special alert tone to be provided on the particular user device;
cause an identification of an operator of the PSAP to be provided to the particular user device; and
cause the announcement, indicating that the emergency callback is being redirected to the particular user device, to be provided to the PSAP.

13. The device of claim 11, wherein the one or more processors are further configured to:
cancel redirection of the emergency callback to one or more of the set of user devices that fail to answer the emergency callback prior to the particular user device.

14. A non-transitory computer-readable medium storing a set of instructions, the set of instructions comprising:
one or more instructions that, when executed by one or more processors of a device, cause the device to:
determine that a failure occurred in an emergency call between a public-safety answering point (PSAP) and a first user device associated with an emergency caller;
bypass authorization policies for the first user device based on determining the failure;
identify, based on determining the failure, one of a first option, a second option, or a third option for redirecting an emergency callback to a contact of the emergency caller;
provide, to the PSAP and when the first option is identified, an announcement associated with redirecting the emergency callback;
cause, based on receiving an indication associated with the announcement and when the first option is identified, the emergency callback to be redirected to a second user device associated with the contact of the emergency caller; and
cause, when the first option is identified, a bearer path to be established between the PSAP and the second user device for the emergency callback.

15. The non-transitory computer-readable medium of claim 14, wherein the one or more instructions, that cause the device to determine that the failure occurred in the emergency call between the PSAP and the first user device, cause the device to:
determine that the first user device failed to answer the emergency callback when the first user device fails to answer the emergency callback within a predetermined time period.

16. The non-transitory computer-readable medium of claim 14, wherein the one or more instructions further cause the device to:
cause a special alert tone to be provided on the second user device; and
cause an identification of an operator of the PSAP to be provided to the second user device.

17. The non-transitory computer-readable medium of claim 14, wherein the one or more instructions further cause the device to:
cause, when the second option is identified, the emergency callback to be sequentially redirected to a set of user devices associated with a set of contacts of the emergency caller; and
cause, when the second option is identified, another bearer path to be established between the PSAP and a particular user device, of the set of user devices, that first answers the emergency callback.

18. The non-transitory computer-readable medium of claim 17, wherein the one or more instructions further cause the device to:
cancel redirection of the emergency callback to one or more of the set of user devices that fail to answer the emergency callback.

19. The non-transitory computer-readable medium of claim 14, wherein the one or more instructions, that cause the device to cause, when the first option is identified, the bearer path to be established between the PSAP and the second user device for the emergency callback, cause the device to:
provide, to a first network device, an invite that includes a session description protocol (SDP) offer from the PSAP;
receive, from the first network device, an SDP answer to the invite;
forward the SDP answer to the PSAP;
receive an acknowledgment of the SDP answer from the PSAP; and
cause the bearer path to be established based on the acknowledgment of the SDP answer.

20. The device of claim 7, wherein the one or more processors, to cause the bearer path to be established between the PSAP and the second user device for the emergency callback, are configured to:
omit a session description protocol (SDP) offer from an invite message for the second user device; and provide, to the second user device and based on omitting the SDP offer, the invite message.

\* \* \* \* \*